United States Patent [19]

Sugimoto et al.

[11] Patent Number: 4,803,349

[45] Date of Patent: Feb. 7, 1989

[54] CARD READ/WRITE DEVICE

[75] Inventors: Osamu Sugimoto, Iruma; Masayuki Watabe, Wako, both of Japan

[73] Assignee: Kabushiki Kaisha Nippon Coinco, Tokyo, Japan

[21] Appl. No.: 937,065

[22] Filed: Dec. 2, 1986

[30] Foreign Application Priority Data

Dec. 5, 1985 [JP] Japan .................... 60-187578[U]

[51] Int. Cl.$^4$ .............................................. G06K 7/00
[52] U.S. Cl. ................................. 235/475; 235/477; 235/480
[58] Field of Search ............... 235/475, 477, 480, 479, 235/483, 485, 486

[56] References Cited

U.S. PATENT DOCUMENTS 3,899,659  8/1975  Nakai .................................. 235/480
3,909,595  9/1979  Morello ............................... 235/480

Primary Examiner—A. D. Pellinen
Assistant Examiner—Leon K. Fuller
Attorney, Agent, or Firm—Koda and Androlia

[57] ABSTRACT

A card read/write device of the type comprising an inlet sensor disposed at a card insertion inlet, a shutter which opens in response to the detection signal from the inlet sensor, a transportation mechanism driving sensor disposed backwardly of the shutter, a card transportation mechanism disposed backwardly of the second-mentioned sensor for transporting the inserted card backwardly and a card information read/write means disposed within the card transportation mechanism, characterized in that when the trailing end of the card passes past the transportation mechanism sensor in the case of returning the card, the card transporting mechanism is deactivated and when the transportation mechanism driving sensor is turned on again under these conditions, the card transportation mechanism is activated again to transport the card backwardly so that the read/write operation of the card is accomplished.

4 Claims, 3 Drawing Sheets

CARD READ/WRITE DEVICE

BACKGROUND OF THE INVENTION

The present invention relates to an improvement of a card read/write device used in an automatic vending machine or an automatic service equipment actuated by a prepaid card.

In the prior art automatic vending machines or automatic service equipment (to be referred to as "card actuated automatic vending machines" hereinafter in this specification) which are actuated by prepaid cards in which are stored the information concerning the amount of money, when a predetermined operation is accomplished in response to the insertion of a card for one time, the settlement information is written on the card and returned to a user. In this case, the card is returned to and maintained at a position from which the user can pull the card out of the machine.

When the user wants to buy a commercial article or to utilize service again under this condition, the user must pull the card out of the machine and insert it into the card insertion inlet again to receive a predetermined operation again.

Therefore it is very cumbersome for the user to repeat the insertion and withdrawal of the card when the user wants the automatic vending machine to repeat its operations.

SUMMARY OF THE INVENTION

The present invention therefore has for its object to provide an automatic vending machine or automatic service equipment which can substantially solve the above-described defect.

In a card read/write device of the type in which a sensor is located at a card insertion inlet; a shutter is provided which opens in response to the detection signal from the sensor; a transportation mechanism driving sensor is disposed backwardly of the shutter; a card transportation mechanism is disposed backwardly of the second mentioned sensor and is actuated in response to the output from the second mentioned sensor so as to transport the inserted card backwardly; and a card information readout device such as a magnetic head when the card is a magnetic card, optical read/write means when the card is an optical memory card or an IC card contactor when the card is an IC card is disposed in the card transportation mechanism, the present invention is characterized in that when the trailing edge of the card passes through the transportation mechanism driving sensor in the case of returning the card, the card transportation mechanism is de-energized or disabled and when the card energizes or enables the transporation mechanism driving sensor again under this condition, the card transporation mechanism is actuated again to transport the card backwardly, whereby the card read/write operation is accomplished.

DETAILED DESCRIPTION OF THE PREFERRED EMBODIMENTS

Figure 1:
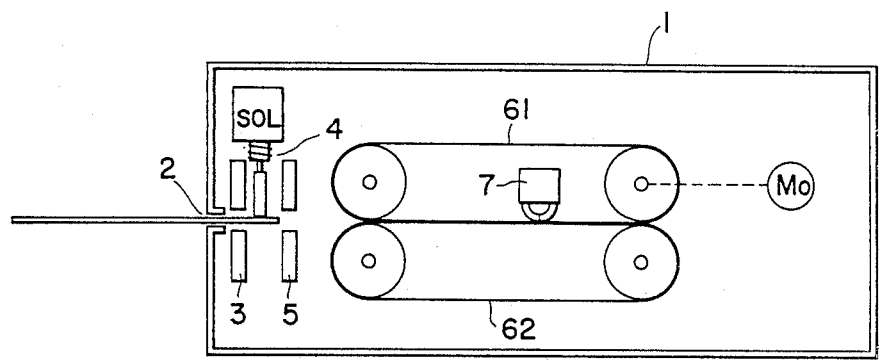
FIG. 1 is a sectional view of a preferred embodiment of the present invention.
Figure 2:
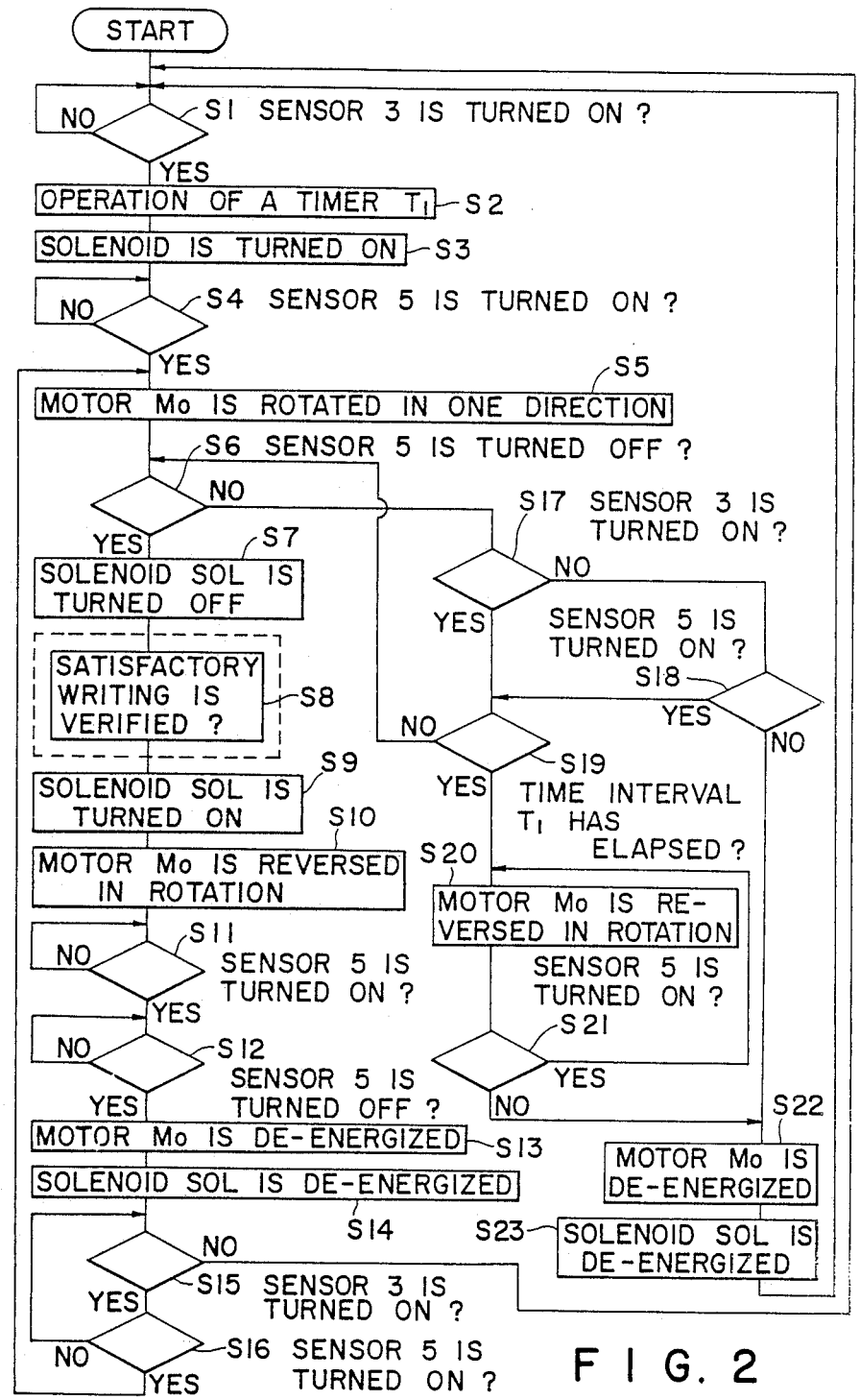
FIG. 2 and FIG. 3 are flowcharts used to explain the mode of operation thereof.
Figure 3:
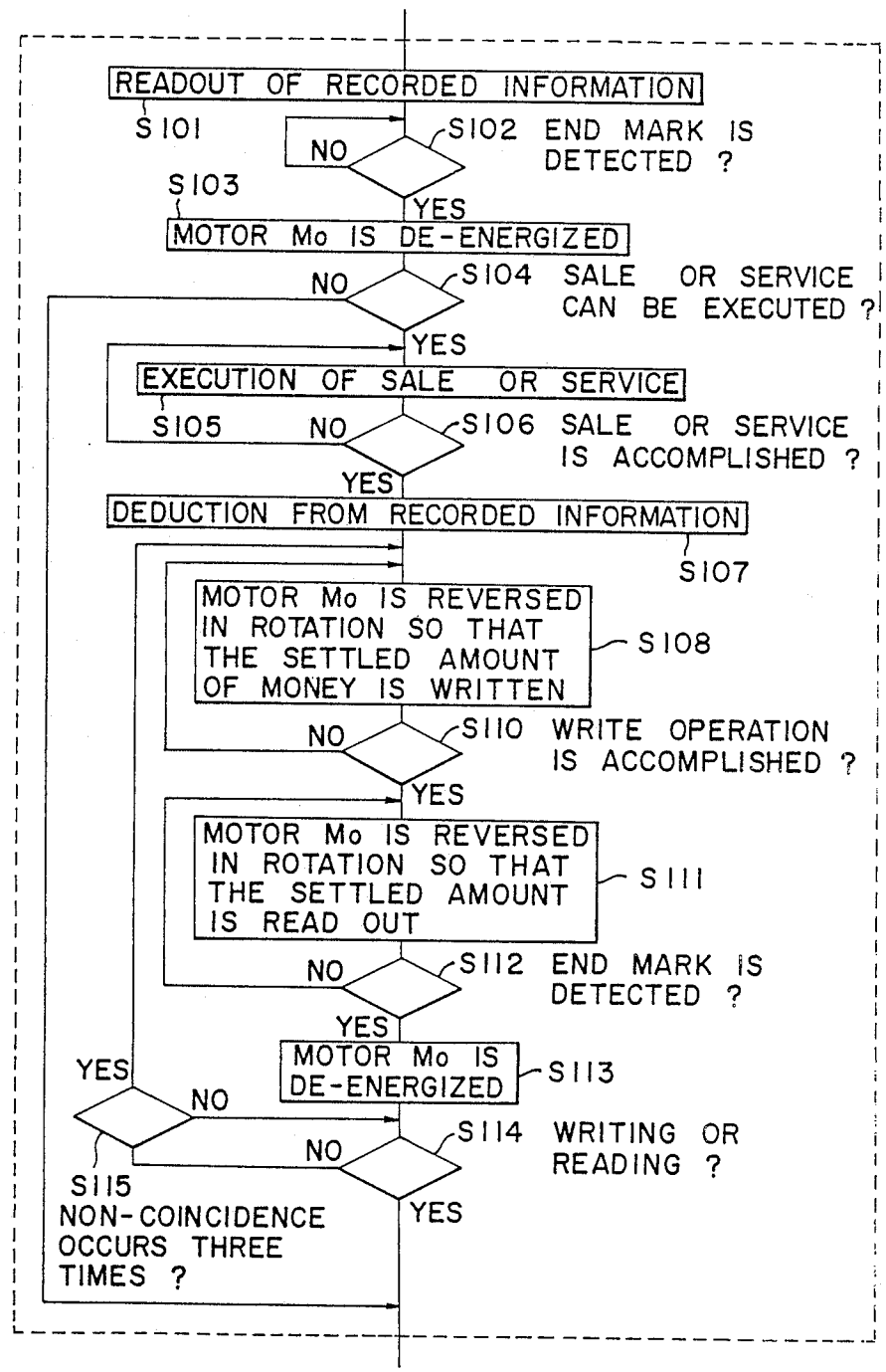

Referring to FIGS. 1, 2 and FIG. 3, a preferred embodiment of the present invention will be described in detail. Reference numeral 1 designates a main body of a card read/write device in accordance with the present invention; 2, a card insertion inlet; 3, an inlet sensor; 4, a shutter actuated by a solenoid SOL to open or close the inlet passage; 5, a transportion mechanism driving sensor; 6, a card transportation mechanism comprising a pair of upper and lower endless belts and a motor Mo for driving the transportion belts 61 and 62; and 7, a device for writing and reading information onto and off of a card; that is, a magnetic head for writing and reading information onto and off of a card in this embodiment.

Next referring to FIG. 2 and FIG. 3 illustrating flowcharts, the mode of operation of the embodiment will be described. When a user inserts his or her card A into the card insertion inlet 2, the inlet sensor 3 is actuated (S1) so that a protective timer T (not shown) is actuated (S2). After about one or two second, the solenoid SOL is energized (S3) so that the shutter is forced to move upwardly, whereby the card passage is opened.

When the user pushes the card A again, the leading end of the card A actuates the sensor 5 (S4) so that the motor Mo is rotated in one direction, whereby the card A is transported to the right direction in FIG. 1.

When the card A passes the sensor 5, the latter is turned off (S6) and the solenoid SOL is de-energized (S7) so that the shutter is closed. Therefore, the insertion of another card into the device can be avoided.

Under these conditions, the motor Mo is kept rotating in one direction so that the card A is transported in the right direction. (The succeeding steps will be described with reference to FIG. 3). During the transportation of the card A, the information stored on the card is read out (S111) and when the END mark is detected (S102), the motor Mo is de-energized (S103) and whether or not an amount of money sufficient for sales of goods or offering a service is read out from the card A is detected (S104). If the amount of money is not sufficient, the solenoid SOL is energized to open the shutter and to cause the motor Mo to move in the other direction (S10), whereby the card A is transported backwardly to the insertion inlet.

When the sensor 5 is turned on (S11) and then turned off (S12), the motor Mo is de-energized so that the transportation of the card A is interrupted (S13) and the solenoid SOL is de-energized (S14) to close the shutter. In this case, the shutter is placed upon the end portion of the card A so that when the card A is pulled out, the sensor 3 is turned off (S15) and consequently the device is returned to its standby state.

When the user pushes the card A again, the sensor 5 is turned on (S16) so that the step 5 and its succeeding steps are carried out in the manner described above.

When the amount of money read out is sufficient to execute sale of goods or service, the sale or service is accomplished (S105). After the confirmation of sale of goods or performance of a service (S106), the price of goods sold or the cost of service is deducted from the amount of money read out and a sales or service settlement is computed (S107).

Thereafter the motor Mo is rotated in the other direction and the settled amount of money is written on the card A (S109). After the confirmation of writing (S110), the motor Mo is rotated in the one direction and the information stored after writing is read out (S111) until the END mark is detected. Upon detection of the END mark (S112), the motor Mo is de-energized.

When the amount of money written is compared with the amount of money read out and if they coincide, the steps starting from the step 9 as shown in FIG. 2 are accomplished.

When they do not coincide with each other, their comparison is repeated three times. Even when they do not coincide with each other, the writing of the settled amount of money on the card is repeated (S115). When the written amount and the readout amount coincide with each other, the steps starting from the step S9 in FIG. 2 are accomplished.

The above-described steps are executed in the case of the normal operation of the card transportation mechanism and in the case of the erratic operation of the card transporation mechanism, the steps 17~23 are executed.

When the sensor 5 remains in the "ON" state even after the card A has been inserted and the motor Mo has been rotated in the "on" direction; that is, when the card A is not transported (S6), after the card insertion sensor 3 remains in the "ON" state for a predetermined time interval (for instance, one second) preset by a timer $T_2$ (S19), the rotation of the motor Mo is reversed (S20) so that the card A is transported toward the insertion inlet. When the sensor 5 is turned off in response to the transportion of the card to its insertion inlet (S21), the motor Mo is de-energized (S22) and also the solenoid SOL is de-energized (S23). Even when the sensor 5 remains in the "ON" state, the sensor 3 remains in the "OFF" state; that is, when the card A is not placed adjacent to the card insertion inlet, whether the sensor 5 is turned on or off is detected again (S18). And when the sensor 5 is in the "ON" state, the motor Mo is de-energized (S22) and then the solenoid SOL is also de-energized (S23). Even when the sensor still remains in the "ON" state, the steps starting from the step S19 are executed so that the motor Mo is reversed in rotation so as to return the card A to the card insertion inlet. Thereafter the motor Mo and the solenoid SOL are de- energized.

One sale or service operation is completed when the card A which is maintained in the above-described state is pulled out.

When one wants further sale or service, he or she pushes lightly the card A remaining in the above-described state so that the sensor 5 is turned on and consequently the card A is transported backwardly in a manner substantially similar to that described above in connection to the first insertion of the card A, whereby sales or service is repeated.

As described above, according to the present invention, the card can be repeatedly used without pulling it out of the automatic vending or service machine Therefore the present invention can be advantageously applied to the automatic vending machines or automatic service machines such as an automatic pinball vending machine interposed between the pinball machines which sell a predetermined number of pinballs at a unit of, for instance, 100 yen, machines which perform various services for a predetermined time interval preset by a timer and the like because sales or services can be repeated only by lightly pushing the card kept inserted in the card insertion inlet.

What is claimed is:

1. A card read/write device comprising:
    an inlet sensor disposed at a card insertion inlet of a card transportation passage;
    a shutter which is disposed adjacent to said card insertion sensor and opens in response to a detection signal from said inlet sensor;
    a transportation mechanism driving sensor disposed in said card transportation passage backwardly of said shutter;
    a card transportation mechanism disposed in said card transportation passage backwardly of said shutter for transporting the inserted card backwardly; and
    card information read/write means disposed in said card transportation mechanism,
    whereby when the trailing edge of the card passes through said transportation mechanism driving sensor in the case of returning the card, said card transportation mechanism is deactivated and when said transportation mechanism driving sensor is turned on again by the card pushed towards backward after staying in said card transportation mechanism, said card transporting mechanism is activated again to transport the card towards said card information read/write means so that the read/write operation of the card is carried out.

2. A card read/write device as set forth in claim 1 wherein said card transportation mechanism is disposed at a predetermined position backwardly of said shutter.

3. A card read/write device as set forth in claim 1 wherein said shutter closes said card transportation passage at a predetermined time interval after said inlet sensor detects the insertion of the card.

4. A card read/write device as set forth in claim 1 wherein when said transportation mechanism driving sensor continues the detection mode even after a predetermined time interval after the detection of said card, said transportation mechanism is reversed in rotation.

* * * * *

UNITED STATES PATENT AND TRADEMARK OFFICE
CERTIFICATE OF CORRECTION

PATENT NO.   : 4,803,349

DATED        : February 7, 1989

INVENTOR(S)  : Osamu Sugimoto & Masayuki Watabe

It is certified that error appears in the above-identified patent and that said Letters Patent is hereby corrected as shown below:

On the title page,
in [73] Assignee:  Change "Kabushiki Kaisha Nippon Coinco" to

--NIPPON CONLUX CO., LTD.--

Signed and Sealed this

Thirtieth Day of April, 1991

Attest:

HARRY F. MANBECK, JR.

Attesting Officer

Commissioner of Patents and Trademarks